United States Patent
Espey

[19]

[11] Patent Number: 6,068,236
[45] Date of Patent: May 30, 2000

[54] ELECTROMAGNETICALLY OPERABLE VALVE

[75] Inventor: Christoph Espey, Waiblingen, Germany

[73] Assignee: DaimlerChrysler AG, Germany

[21] Appl. No.: 09/060,217

[22] Filed: Apr. 15, 1998

[30] Foreign Application Priority Data

Apr. 17, 1997 [DE] Germany ............... 197 16 041

[51] Int. Cl.⁷ ............................................... F16K 31/02
[52] U.S. Cl. ................................. 251/129.07; 251/282
[58] Field of Search ............... 251/129.07, 129.08, 251/129.02, 282

[56] References Cited

U.S. PATENT DOCUMENTS

| | | | |
|---|---|---|---|
| 3,955,597 | 5/1976 | Oneyama et al. | 137/625.25 |
| 3,980,237 | 9/1976 | Parrish, Jr. | 239/533.3 |
| 4,312,376 | 1/1982 | Allen | 137/494 |
| 4,313,590 | 2/1982 | Nishimiya | 251/129 |
| 4,540,155 | 9/1985 | Redston et al. | 251/129.2 |
| 4,550,875 | 11/1985 | Teerman et al. | 239/88 |
| 4,573,659 | 3/1986 | Homes | 251/129.02 |
| 4,580,760 | 4/1986 | Harris | 251/77 |
| 5,038,826 | 8/1991 | Kabai et al. | 137/625.65 |
| 5,370,095 | 12/1994 | Yamaguchi et al. | 123/446 |
| 5,540,412 | 7/1996 | Doll | 251/129.07 |
| 5,556,075 | 9/1996 | Weber | 251/282 |
| 5,593,095 | 1/1997 | Davis et al. | |
| 5,617,998 | 4/1997 | Buckley et al. | 239/95 |
| 5,701,874 | 12/1997 | Sari et al. | 251/129.07 |
| 5,743,470 | 4/1998 | Schlaf et al. | 239/533.4 |

FOREIGN PATENT DOCUMENTS

| | | |
|---|---|---|
| 0 367 114 | 5/1990 | European Pat. Off. . |
| 0 419 352 | 3/1991 | European Pat. Off. . |
| 0 588 475 | 3/1994 | European Pat. Off. . |
| 2419613 | 11/1975 | Germany ............... 251/282 |
| 30 06 576 | 9/1980 | Germany . |
| 3006576C2 | 9/1980 | Germany . |
| 34 06 198 | 8/1984 | Germany . |
| 3406198C2 | 8/1984 | Germany . |
| 3431677A1 | 3/1986 | Germany . |
| 1197738 | 7/1970 | United Kingdom . |
| 2140129A | 11/1984 | United Kingdom . |
| WO91/11609 | 8/1991 | WIPO . |

OTHER PUBLICATIONS

Search Report Aug. 10, 1998 United Kingdom.

*Primary Examiner*—John Rivell
*Assistant Examiner*—Meredith H. Schoenfeld
*Attorney, Agent, or Firm*—Evenson, McKeown, Edwards & Lenahan, P.L.L.C.

[57] ABSTRACT

An electromagnetically operable valve has a valve seat and a valve body. A valve stem forms a guide part provided with a shoulder, by way of which guide part the valve is axially movably guided in a valve guide. A valve disk which, in the closing position of the valve, while forming a hydraulically effective seat diameter, rests against the valve seat. An electromagnetic adjusting device and a spring guide the valve into respective end positions. A control space with a fuel pressure bore is formed between a shoulder of the guide part and the valve disk, and hydraulic forces in the control space act upon the shoulder and the valve disk. In order to construct an electromagnetically operable valve such that an optimal closing and opening function of the valve is ensured for its whole operating time, it is provided that the hydraulically effective seat diameter of the valve is limited such that the hydraulic forces acting upon the shoulder of the guide part and the valve disk in the closing position of the valve are essentially balanced.

12 Claims, 2 Drawing Sheets

ELECTROMAGNETICALLY OPERABLE VALVE

This application claims the priority of application 197 16 041.7-13, filed in Germany on Apr. 17, 1997, the disclosure of which is expressly incorporated by reference herein.

BACKGROUND AND SUMMARY OF THE INVENTION

The invention relates to an electromagnetically operable valve having a valve stem and a valve body. Preferred embodiments of the invention relate to an electromagnetically operable valve with a valve seat and a valve body, a valve stem, which forms a guide part provided with a shoulder, by way of which guide part the valve is axially movably guided in a valve guide, a valve disk which, in the closing position of the valve, while forming an hydraulically effective seat diameter, rests against the valve seat, an electromagnetic adjusting device and a spring by which the valve can be guided into end positions, and a control space with a fuel pressure bore formed between a shoulder of the guide part and the valve disk, hydraulic forces in the control space acting upon the shoulder and the valve disk.

A valve of the above-mentioned type of an injection arrangement is known from German Patent Document DE 34 06 198 C2. The electromagnetically operable valve has a valve seat, a valve stem with a guide part, a valve disk, an electromagnetic adjusting device and a spring. By way of the guide part, the valve is axially movably guided in the valve guide. The adjusting device and the spring guide the valve into the end positions. In the closing position of the valve, the valve disk rests against the valve seat. The guide part has a shoulder which forms a control space with a fuel pressure bore between itself and the valve disk. In the control space, hydraulic forces act upon the shoulder and the valve disk.

It is a disadvantage of the above-mentioned valve that, during the operating time of the valve, the hydraulic conditions in the control space change toward an imbalance. During its operating time, the valve disk will work itself into the valve seat which considerably increases the hydraulically effective seat diameter of the valve and thus the hydraulic force acting upon the valve disk and causes an earlier opening of the valve or, in extreme cases, an unintentional opening of the valve already during the injection.

Concerning the general technical background, reference is also made to German Patent Document DE 30 06 576 C2.

It is an object of the invention to construct a valve such that an optimal closing and opening operation of the valve is ensured during its whole operating time.

This object is achieved in certain preferred embodiments of the invention by providing an arrangement of the above noted type wherein the hydraulically effective seat diameter of the valve is limited such that the hydraulic forces acting upon the shoulder of the guide part and the valve disk in the closing position of the valve are essentially balanced.

An important advantage of the invention is the fact that, as the result of limiting the hydraulically effective seat diameter, the hydraulic forces in the control space are essentially balanced and the magnetic force of the adjusting device which is responsible for the closing position of the valve can therefore be designed to be lower. An unintentional opening of the valve in the closing phase is effectively prevented. The abrasive wear on the valve seat caused by particles which are transported by the fuel has only negligible effects on the closing and opening function of the valve. Even during a long operating time of the valve, the hydraulic conditions in the control space stay approximately the same.

DETAILED DESCRIPTION OF THE DRAWINGS

Figure 1:
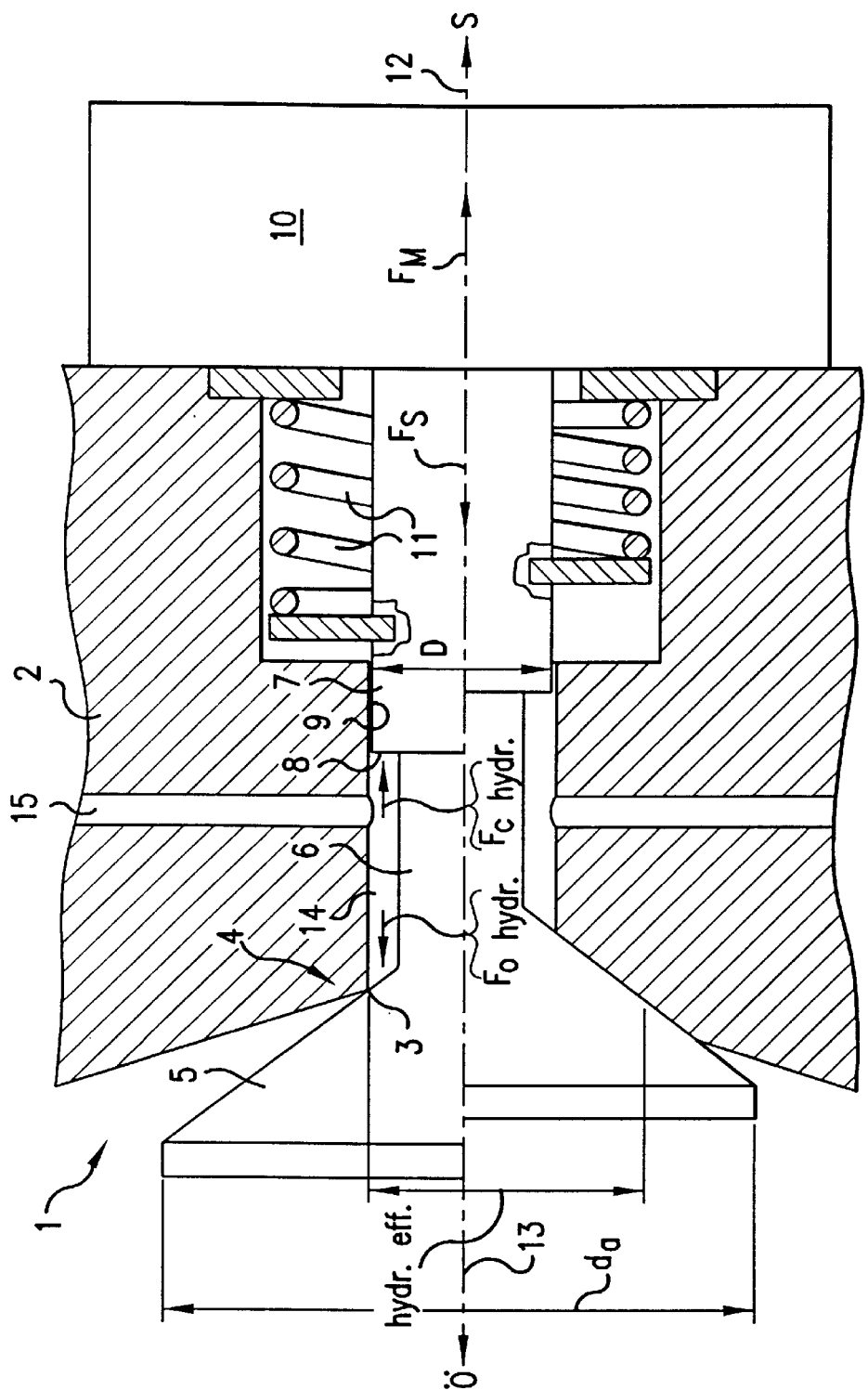
FIG. 1 is a sectional view of an electromagnetically operable valve, similar to that of the type-forming German Patent Document DE 34 06 198 C2, in the closing position with a valve seat and valve body, the valve disk, while forming a hydraulically effective seat diameter, resting against the valve seat, and having a spring and an electromagnetic adjusting device.
Figure 2:
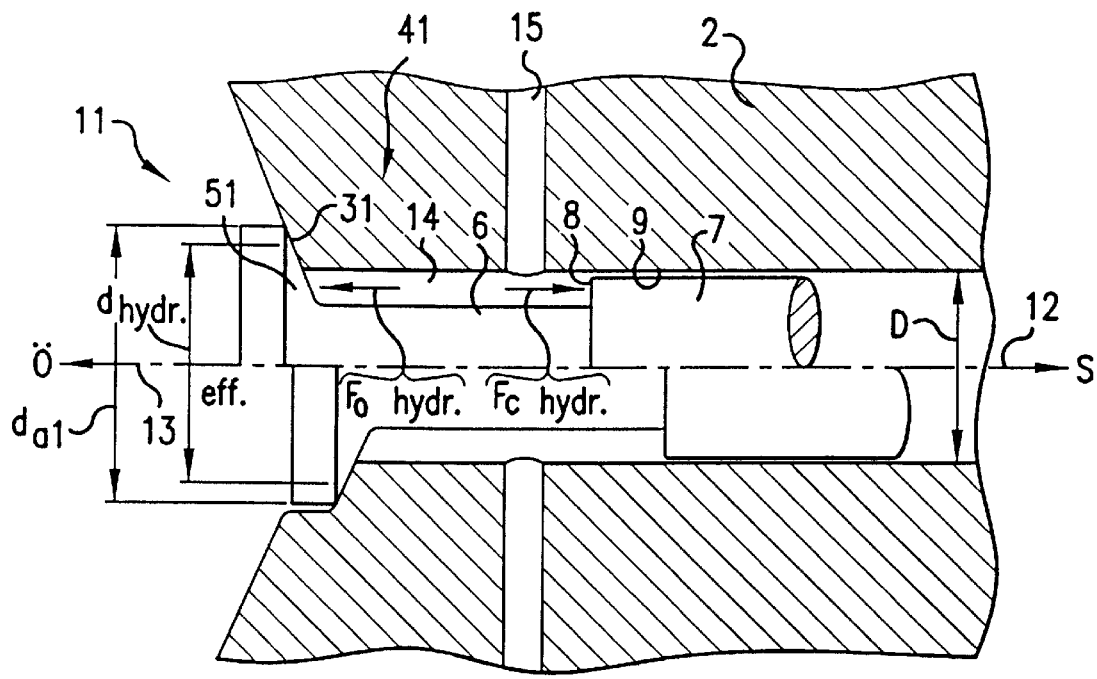
FIG. 2 is a sectional depiction of an electromagnetically operable valve, according to a first embodiment of the invention, the hydraulically effective seat diameter being limited by the valve body geometry.
Figure 3:
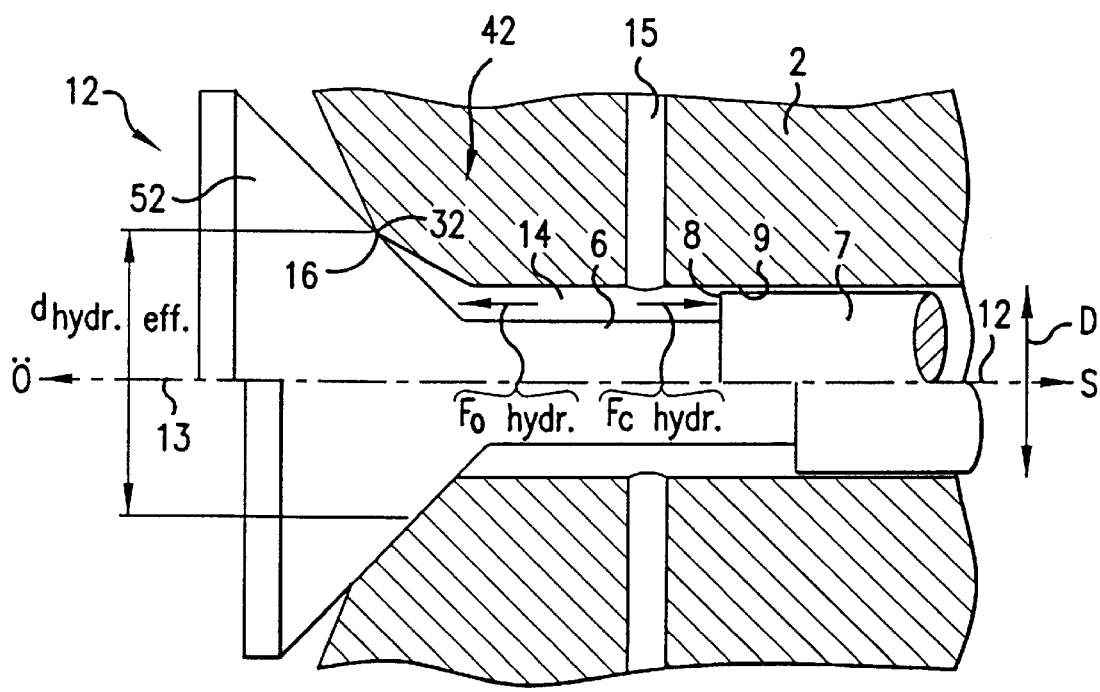
FIG. 3 is a sectional depiction of an electromagnetically operable valve, according to a second embodiment of the invention, the hydraulically effective seat diameter being limited by the valve seat geometry.

FIGS. 1 to 3 illustrate electromagnetically operable valves 1, $1_1$ and $1_2$, in which case the respective upper area of the figures shows the respective valves 1, $1_1$ and $1_2$ in the new condition and the lower area of the figures shows the respective valves 1, $1_1$ and $1_2$ after a certain operating time. Similar components in the figures have the same reference symbols.

FIG. 1 shows a valve 1 of the above-mentioned type which is inserted in a housing 2, for example, of a fuel injection pump and has a valve seat 3 and a valve body 4. The valve body 4 comprises a valve disk 5 and a valve stem 6 having a guide part 7, in which case the guide part 7 forms a shoulder 8. By way of the guide part 7, the valve 1 is axially movably guided in a valve guide 9 of the housing 2 and can be opened or closed, in which case, in the closing position of the valve 1, the valve disk 5 rests sealingly against the valve seat 3 while forming an hydraulically effective seat diameter $d_{hydr.eff.}$.

By means of an electromagnetic adjusting device 10 as well as a spring 11, the valve 1 can be guided into its end positions, that is, into the opening or closing position, the electromagnetic adjusting device 10 acting in the closing direction 12 and the spring 11 acting in the opening direction of the valve 1.

Between the shoulder 8 of the guide part 7 and the valve disk 5 a control space 14 is formed which has a fuel pressure bore 15 leading to the injection pump. A hydraulic force $F_{O\ hydr.}$ in the opening direction 13 is applied to the valve disk 5, and a hydraulic force $F_{C\ hydr.}$ in the closing direction 12 of the valve 1 is applied to the shoulder 8. In the ideal condition of the valve 1, which in the present case is the new condition of the valve 1, the hydraulically effective seat diameter $d_{hydr.eff.}$ corresponds to the diameter D of the valve guide or bore 9, whereby the hydraulic conditions $F_{O\ hydr.}:F_{C\ hydr.}$ in the control space 14 are balanced. In this ideal condition, the hydraulic force $F_{C\ hydr.}$, which acts upon the shoulder 8 of the guide part 7 in the closing direction 12 of the valve 1, corresponds exactly to the hydraulic force $F_{o\ hydr.}$ which acts upon the valve disk 5 in the opening direction 13 of the valve 1, in which case the hydraulic force $F_{o\ hydr.}$ in the opening direction 13 is a function of the hydraulically effective seat diameter $d_{hydr.eff.}$, and the hydraulic force $F_{c\ hydr.}$ in the closing direction 12 is a function of the diameter D of the valve guide 9.

During the closing, the axially movable valve 1 is displaced by the magnetic force $F_M$ of the electromagnetic adjusting device 10 against the spring force $F_r$ of the opening spring 11 into the closing direction 12, the valve disk S resting on the valve seat 3. During the opening movement of the valve 1, the spring 11 causes an opposite movement of the valve 1 in the opening direction 13 and therefore a lifting of the valve disk 5 off the valve seat 3.

The working of the valve disk 5 into the valve seat 3 and a resulting widening of the seat during the operating time of the valve 1, as indicated in the lower area of FIG. 1, change the hydraulic conditions $F_{\bar{o}}$ hydr.:$F_{c\ hydr.}$ and therefore the whole balance of forces at the valve 1. The widening of the seat of the valve 1 leads to an enlargement of the hydraulically effective seat diameter $d_{hydr.eff.}$, as illustrated in FIG. 1. The valve 1 therefore experiences a resulting hydraulic force $F_{o\ hydr.}$ in the opening direction 13. This resulting force $F_{\bar{o}}$ hydr.in the opening direction 13 acts, in addition to the spring force $F_S$, against the magnetic force $F_M$ responsible for the closing of the valve 1 and causes an unintentional premature opening of the valve 1. When the valve 1 is used in an injection pump, this would mean an unintentional premature opening during the injection. Even in the case of a slight enlargement of the hydraulically effective seat diameter $d_{hydr.eff.}$, the magnetic force $F_M$ is overcome by the spring force $F_S$ and the hydraulic force $F_{o\ hydr.}$ in the opening direction 13.

In order to prevent that the hydraulic force $F_{\bar{o}}$ hydr.in the opening direction 13 increases too much during the operating time of the valve 1 and thus an increase of the magnetic force $F_M$ responsible for the closing becomes necessary for the perfect functioning of the valve 1, according to the invention, the hydraulically effective seat diameter $d_{hydr.\ eff.}$ of the valve 1 is compulsorily limited. In the ideal case, the limiting causes a balancing of forces between the hydraulic forces $F_{\bar{o}}$ hydr.and $F_{C\ hydr.}$ in the control space 14, whereby only the spring force $F_S$ and the magnetic force $F_M$ still act upon the valve 1. Outside the ideal case, the limiting of the hydraulically effective seat diameter has the result that the hydraulic force $F_{O\ hydr.}$ in the opening direction 13 is in an uncritical range and thus no unintentional opening of the valve takes place. A limiting of the hydraulically effective seat diameter $d_{hydr.eff.}$, may, as illustrated in FIGS. 2 and 3, take place by the geometry of the valve body 4 or of the valve seat 3.

FIG. 2 shows the limiting of the hydraulically effective seat diameter $d_{hydr.\ eff.}$ by the geometry of the valve body $4_1$. A reduction of the outside diameter $d_{a1}$ of the valve disk $5_1$ in the area of the valve seat $3_1$, in contrast to the outside diameter $d_a$ of the valve disk 5 of FIG. 1, compulsorily leads to a limiting of the hydraulically effective seat diameter $d_{hydr.eff.}$ so that the forces $F_{o\ hydr.}$, $F_{c\ hydr.}$, which in the closing position of the valve $1_1$ act upon the shoulder 8 of the guide part 7 and the valve disk $5_1$, are essentially the same. The hydraulically effective seat diameter $d_{hydr.eff.}$ remains approximately the same for the operating time of the valve $1_1$.

As another possibility for limiting the hydraulically effective seat diameter $d_{hydr.eff.}$ of a valve, a valve is contemplated which seals off by means of an outside radius in a circular-line-shaped manner. Based on a hydraulically not ideal but nevertheless uncritical starting position (new condition of the valve), this would result, after the working-in of the valve during its operating time, in a reduction of the hydraulically effective seat diameter $d_{hydr.eff.}$ because the valve works itself into the valve seat from the outside to the inside, and would thus lead to an improvement of the hydraulic conditions. The hydraulically effective seat diameter $d_{hydr.eff.}$ has the highest value in the new condition, which is elected such that it is still in the uncritical range; that is, the hydraulic force $F_{o\ hydr.}$ upon the valve disk does not yet cause an unintentional opening of the valve.

In FIG. 3, the limiting of the hydraulically effective seat diameter $d_{hydr.eff.}$ takes place by the geometry of the valve seat $3_2$. In the new condition, the valve $1_2$ rests with a slightly larger hydraulically effective seat diameter $d_{hydr.eff.}$ a projecting edge 16 of the valve seat $3_2$, in which case the seat diameter $d_{hydr.eff.}$ is, however, still in the uncritical range. During the operating time of the valve $1_2$, the valve seat $3_2$ works itself in toward the outside and inside, whereby the hydraulically effective seat diameter $d_{hydr.eff.}$ remains unchanged and therefore continues to remain uncritical. The hydraulic force $F_{O\ hydr.}$, which in the closing position of the valve $1_2$ acts upon the valve disk $5_2$, is only insignificantly higher than the hydraulic force $F_{C\ hydr.}$ acting on the shoulder 8 of the guide part 7 and therefore causes no unintentional opening of the valve $1_2$ in the closing phase.

As another possibility of limiting the hydraulically effective seat diameter $d_{hydr.eff.}$ by the valve seat geometry a collar on the house as the valve seat is contemplated, whereby the valve could work itself only into a surface limited to the collar and the hydraulically effective seat diameter $d_{hydr.eff.}$ would thereby be limited.

In addition, the hydraulically effective seat diameter $d_{hydr.eff.}$ could be limited by the valve body geometry or the valve seat geometry such that it corresponds to the diameter D of the valve guide 9 according to contemplated preferred embodiments of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Electromagnetically operable valve, comprising:

a valve seat, a valve body including a valve stem and a valve disk, said valve stem having a guide shoulder which in use is axially movably guided in a valve guide, said valve disk being configured to rest against the valve seat while forming a hydraulically effective seat diameter in a closing position of the valve, an electromagnetic adjusting device and a spring by which the valve body can be guided into respective end positions, and a control space with a fuel pressure bore formed between the guide shoulder and the valve disk with hydraulic forces in the control space acting upon the guide shoulder and the valve disk, wherein the valve disk includes a conical surface which merges with an outer circumference of an adjoining axially extending disk surface to form an annular merging location, wherein the valve body includes a conical surface which in use faces and abuts the conical surface of the valve disk, wherein said valve body and valve disk are constructed such that, during a wear life of the valve, said conical surface of the valve body is worn by said annular merging location being displaced axially into the valve body while maintaining a substantially constant hydraulic effective diameter such that hydraulic forces acting on the guide shoulder and on the valve disk are essentially balanced throughout said wear life.

2. Electromagnetically operable valve according to claim 1, wherein the hydraulically effective seat diameter corresponds to the diameter of the valve guide.

3. Electromagnetically operable valve according to claim 1, wherein the essentially balanced hydraulic forces prevent an unintentional opening of the valve during the closing position.

4. Electromagnetically operable valve, comprising:

a valve seat, a valve body including a valve stem and a valve disk, said valve stem having a guide shoulder which in use is axially movably guided in a valve guide, said valve disk being configured to rest against the valve seat while forming a hydraulically effective seat diameter in a closing position of the valve, an electromagnetic adjusting device and a spring by which the valve body can be guided into respective end positions, and a control space with a fuel pressure bore formed between the guide shoulder and the valve disk with hydraulic forces in the control space acting upon the guide shoulder and the valve disk, wherein the valve seat, when in an unworn condition, includes a first conical surface extending radially outwardly from an opening for the valve guide and a second conical surface extending radially outward of and angularly inclined with respect to the first conical surface to thereby form an annular tapering abutment surface at an intersection of said first and second conical surfaces, wherein the valve disk includes a conical surface which in use of the valve initially abuttingly contacts said abutment surface, and wherein, during a wear life of the valve, said tapering abutment surface is worn away by the conical surface of the valve disk while maintaining a substantially constant hydraulic effective diameter such that hydraulic forces acting on the guide shoulder and on the valve disk are essentially balanced throughout said wear life.

5. Electromagnetically operable valve according to claim 4, wherein the hydraulically effective seat diameter corresponds to the diameter of the valve guide.

6. Electromagnetically operable valve according to claim 4, wherein a hydraulic force in the opening direction and a hydraulic force in the closing direction are essentially the same.

7. Electromagnetically operable valve according to claim 4, wherein said valve guide is operatively connected to said spring.

8. Electromagnetically operable valve according to claim 4, wherein the essentially balanced hydraulic forces prevent an unintentional opening of the valve during the closing position.

9. Electromagnetically operable valve according to claim 4, wherein a change in the substantially hydraulic effective diameter is in a range that maintains the essentially balanced hydraulic forces.

10. An electromagnetically operable valve, comprising:

a valve seat, a valve body including a valve stem and a valve disk, said valve stem having a guide shoulder which in use is axially movably guided in a valve guide, said valve disk being configured to rest against the valve seat while forming a hydraulically effective seat diameter in a closing position of the valve, an electromagnetic adjusting device and a spring by which the valve body can be guided into respective end positions, and a control space with a fuel pressure bore formed between the guide shoulder and the valve disk with hydraulic forces in the control space acting upon the guide shoulder and the valve disk, wherein the valve disk includes a conical surface which merges with an outer circumference of an adjoining axially extending disk surface to form an annular merging location, wherein the valve body includes a conical surface which in use faces and abuts the conical surface of the valve disk, wherein said valve body and valve disk are constructed such that, during a wear life of the valve, said conical surface of the valve body is worn by said annular merging location being displaced axially into the valve body while maintaining a substantially constant hydraulic effective diameter.

11. An electromagnetically operable valve comprising:

a valve seat, a valve body including a valve stem and a valve disk, said valve stem having a guide shoulder which in use is axially movably guided in a valve guide, said valve disk being configured to rest against the valve seat while forming a hydraulically effective seat diameter in a closing position of the valve, an electromagnetic adjusting device and a spring by which the valve body can be guided into respective end positions, and a control space with a fuel pressure bore formed between the guide shoulder and the valve disk with hydraulic forces in the control space acting upon the guide shoulder and the valve disk, wherein the valve seat, when in an unworn condition, includes a first conical surface extending radially outwardly from an opening for the valve guide and a second conical surface extending radially outward of and angularly inclined with respect to the first conical surface to thereby form an annular tapering abutment surface at an intersection of said first and second conical surfaces, wherein the valve disk includes a conical surface which in use of the valve initially abuttingly contacts said abutment surface, and wherein, during a wear life of the valve, said tapering abutment surface is worn away by the conical surface of the valve disk while maintaining a substantially constant hydraulic effective diameter.

12. An electromagnetically operable valve according to claim 11, wherein hydraulic forces acting on the guide shoulder and on the valve disk are essentially balanced throughout said wear life, thereby preventing an unintentional opening of the valve during the closing position.

* * * * *